US 6,460,178 B1

(12) United States Patent
Chan et al.

(10) Patent No.: US 6,460,178 B1
(45) Date of Patent: Oct. 1, 2002

(54) SHARED LIBRARY OPTIMIZATION FOR HETEROGENEOUS PROGRAMS

(75) Inventors: Hon Keat W. Chan, Bellevue; Andrew J. Edwards, Redmond; Amitabh Srivastava, Woodinville; Hoi H. Vo, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/343,279

(22) Filed: Jun. 30, 1999

(51) Int. Cl.$^7$ ................................................. G06F 9/45

(52) U.S. Cl. ..................... 717/147; 717/116; 717/118; 717/141; 717/146; 717/163; 717/164; 717/165

(58) Field of Search .......................... 717/11, 2, 7, 9, 717/141, 146, 147, 116, 118, 10, 163, 164, 165

(56) References Cited

U.S. PATENT DOCUMENTS

| | | | | |
|---|---|---|---|---|
| 5,280,613 A | | 1/1994 | Chan et al. ................ 395/700 |
| 5,553,286 A | * | 9/1996 | Lee ............................ 717/4 |
| 5,559,884 A | | 9/1996 | Davidson et al. ............. 380/4 |
| 5,661,191 A | | 8/1997 | Haraguchi et al. ........... 521/59 |
| 5,664,191 A | | 9/1997 | Davidson et al. .......... 395/670 |
| 5,790,858 A | | 8/1998 | Vogel ....................... 395/704 |
| 5,923,878 A | * | 7/1999 | Marsland ...................... 717/4 |
| 6,253,369 B1 | * | 6/2001 | Cloud et al. ................... 717/5 |

OTHER PUBLICATIONS

Goto et al., "Optimized Code Generation for Heterogeneous Computing Environment Using Parallelizing Compiler TINPAR", IEEE, pp.: 1–8, Oct. 1998.*

Jan. 1995, "Verification of ANDF components," Frederic Broustaut, Christian Fabre, Francois de Ferriere, Eric Ivanov—Open Software Foundation Research Institute; Mauro Fiorentini—Etnoteam$^2$, originally published in the proceedings of the First ACM Workshop on Intermediate Representations (IR '95).

De Bosschere, K. et al., "Alto: A Link–Time Optimizer for the DEC Alpha.", *Technical Report TR–98–14,* (1996).

Goodwin, D.W., "Interprocedural Dataflow Analysis in an Executable Optimizer", Proceedings on SIGPLAN'97 Conference on Programming Language Design and Implementation, (1997).

Hastings, R., et al., "Purify: Fast Detection of Memory Leaks and Access Errors", Proceedings of Winter Usenix Conference, , (Jan. 1992).

Larus, J., et al., "Rewriting Executable Files to Measure Profeam Behavior", *Software Practice and Experience,* 24(2), 197–218, (1994).

Larus, J.R., "EEL: Machine–Independent Executable Editing", *ACM SIGPLAN Notices,* 30(6), pp. 291–300, (Jun. 1995).

Lee, H., et al., "BIT: A Tool for Instrumenting Java Bytecodes", Proceedings of the 1997 Usenix Symposium pn Internet Technologies and Systems, (1997).

(List continued on next page.)

*Primary Examiner*—Tuan Q. Dam
*Assistant Examiner*—Ted T. Vo
(74) *Attorney, Agent, or Firm*—Merchant & Gould P.C.

(57) ABSTRACT

A shared library optimization process relocates a code block in a platform-neutral intermediate representation (IR) of a library into the IR of another library. The shared library optimization process preserves the original control flow that passed through the relocated code block using forwarding pointers and address substitution. The shared library optimization process can also relocate code blocks from multiple shared libraries into an existing shared library, or from one shared library into an empty shared library. The shared libraries to be optimized are specified by a user, as is the type of optimization to be performed.

23 Claims, 6 Drawing Sheets

OTHER PUBLICATIONS

Romer, T., et al., "Instrumentation and Optimization of Win32/Intel Executables Using Etch", Proceedings of the USENIX Windows NT Workshop, (1997).

Srivastava, A., et al., "A Practical System for Intermodule Code Optimization at Link Time", *Journal of Programming Language,* 1(1), 1–18, (1993).

Srivastava, A., et al., "ATOM, A System for Buidling Customized Program Analysis Tools", *ACM SIGPLAN Notices,* 29(6), pp. 196–205, (Jun. 1994).

Wall, D.W., "Systems of Late Code Modification, in Code Genetatio–Concepts, Tools Technique", Robert Giegrich and Susan L. Graham, eds, 275–293, (1992).

* cited by examiner

SHARED LIBRARY OPTIMIZATION FOR HETEROGENEOUS PROGRAMS

RELATED APPLICATIONS

The present application is related to U.S. Patent applications entitled "Translation And Transformation of Heterogeneous Programs" (U.S. patent application Ser. No. 09/343,805), "Instrumentation and Optimization Tools for Heterogeneous Programs" (U.S. patent application Ser. No. 09/343,298), "Cross Module Representation in Heterogeneous Programs" (U.S. patent application Ser. No. 09/343,287), and "Application Program Interface for Transforming Heterogeneous Programs" (U.S. patent application Ser. No. 09/343,276), filed on the same day as the present application and assigned to the same assignee.

FIELD OF THE INVENTION

This invention relates generally to programming tools, and more particularly to translating code between computer architectures.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright ® 1998, Microsoft Corporation, All Rights Reserved.

BACKGROUND OF THE INVENTION

In a new programming paradigm, a program is now a collection of components. Each component publishes an interface without exposing its inner details. Thus, a component can internally exist in any form: Intel x86 binary, Intel IA-64 binary, Visual Basic (VB) byte codes, Java class files, or any Virtual Machine (VM) binary. A heterogeneous program consists of components in different forms. Heterogeneous programs already exist in some environments: in the Microsoft Windows 32-bit environment, a Visual Basic program is compiled into VB byte codes that can call native-compiled functions in a separate dynamic linked library. Similarly Java class files can call native functions. Intel's IA-64 architecture allows IA-64 code to co-exist with x86 code.

To understand the behavior of a heterogeneous program, all its components, regardless of their form, have to be instrumented and analyzed in the same framework, otherwise, only partial information will be collected. It is important to note that systems that have been ported to several architectures are not sufficient to handle heterogeneous programs. For example, a system for VB byte codes that has been ported to x86, cannot provide a complete execution time analysis of a heterogeneous program consisting of VB byte codes and native x86 because each system operates in isolation on its own input.

Further, a heterogeneous program may consist of heterogeneous components. A heterogeneous component is a single component consisting of routines in different instruction sets. As the interface is well defined, components internally can use any instruction set. Each instruction set has its own advantages such as execution time, portability, and size.

All previous systems have been designed for homogeneous programs: conventional programs consisting of components in the same form. Some systems have been targeted to different architectures, but cannot work with heterogeneous programs. None of these systems can generate a heterogeneous component.

A large number of systems have been developed to help analyze and optimize homogeneous programs. The creation of "Pixie" by MIPS Computers Systems, Inc. in 1986 started a class of basic block counting tools by inserting predetermined sequence of instructions to record execution frequencies of basic blocks. "Epoxie" extended the technique by using relocations to eliminate dynamic translation overheads. David W. Wall. Systems for late code modification, in Code Generation—Concept, Tools Techniques, pp. 275–293, (Robert Giegrich and Susan L. Graham, eds, 1992). "QPT" further extended the technique by constructing spanning trees to reduce the number of basic blocks that are instrumented. James Larus and Thomas Ball, Rewriting executable files to measure program behavior, Software, Practice and Experience, vol. 24, no. 2, pp 197–218 (1994). "Purify" instruments memory references to detect out-of-bounds memory accesses and memory leaks. Reed Hastings and Bob Joyce, Purify: Fast Detection of memory Leaks and Access Errors, Proceedings of Winter Usenix Conference, January 1992.

"OM" allowed general transformations to be applied to a binary by converting the binary to an intermediate representation that can be easily manipulated. AmitabhSrivastava and David Wall, A Practical System for Intermodule Code Optimization at Link Time, Journal of Programming Language, 1(1):1–18 (1993). OM has been implemented on MIPS, DEC Alpha and Intel x86 architectures. "EEL" uses a similar technique and provides an editing library for Sun SPARC architectures. James R. Larus and Eric Schnarr, EEL: machine-Independent Executable Editing, Proceedings of SIGPLAN' 95 Conference on Programming Language Design and Implementation (1995). "Alto" and "Spike" are optimizers for the DEC Alpha architectures. K. De Bosschere and S. Debray, Alto: a Link-Time Optimizer for the DEC Alpha. Technical Report TR-96-16, Computer Science Department, University of Arizona (1996). David W. Goodwin, Interprocedural Dataflow Analysis in an Executable Optimizer, Proceedings of SIGPLAN' 97 Conference on Programming Language Design and Implementation (1997).

"ATOM" extended OM by providing a flexible instrumentation interface for the DEC Alpha and Intel x86 systems. Amitabh Srivastava and Alan Eustace, ATOM: A System for Building Customized Program Analysis Tools, Proceedings of SIGPLAN' 94 Conference on Programming Language Design and Implementation (1994). However, ATOM does not allow modifications to a binary. "Etch" provided a similar system for x86 and "BIT" for Java byte codes. T. Romer, G. Voelker, D. Lee, A. Wolman, W. Wong, H. Levy, B. Chen, and B. Bershad, Instrumentation and Optimization of Win32Intel Executables Using Etch, Proceedings of the USENIX Windows NT Workshop (1997). Han Lee and Benjamin Zorn, BIT: A Tool for instrumenting Java bytecodes. Proceedings of the 1997 USENIX Symposium on Internet Technologies and Systems (1997).

None of these systems work on heterogeneous programs. Some of them have been ported to multiple architecture but they provide only a partial view when applied to heterogeneous programs as each implementation operates on its input in isolation. Although OM builds a symbolic representation, the representation was primarily designed for applying arbitrary transformations and is not sufficient to handle heterogeneous programs. None of these systems can generate heterogeneous components. ATOM provides a flexible interface for instrumentation only.

A heterogeneous program commonly invokes shared libraries to perform pre-defined functions. Shared libraries are used to provide the same pre-defined functions to multiple programs through a well-defined interface. Shared libraries also enable small patch releases. Only those shared libraries whose code has changed must be shipped as part of patch release. Finally, a shared library provides a unit in which to consolidate all code shipped for a particular organization.

However, using a large number of shared libraries can have an adverse impact on performance. Because binary optimizers are limited to a single library, the optimizations are less effective when the libraries contain less code. For example, it is not possible to pack code on a single page for working set optimization when the code is split among different libraries. Procedure calls that span libraries cannot be inlined. Boot time may be affected by the flow of control jumps between libraries.

Thus, it is advantageous to combine libraries together but doing so requires the ability to view all the code for the libraries as a whole and then partition it into libraries based on all these factors. Because the libraries can change across revisions and because libraries in a heterogeneous environment can be programmed for different platforms, there is a need for a shared library optimizer that operates on the libraries at the binary level and across architectural boundaries.

SUMMARY OF THE INVENTION

The above-mentioned shortcomings, disadvantages and problems are addressed by the present invention, which will be understood by reading and studying the following specification.

A shared library optimization process relocates a code block in a platform-neutral intermediate representation (IR) of a library into the IR of another library. The shared library optimization process preserves the original control flow that passed through the relocated code block using forwarding pointers and address substitution. The shared library optimization process can also relocate code blocks from multiple shared libraries into an existing shared library, or from one shared library into an empty shared library. The shared libraries to be optimized are specified by a user, as is the type of optimization to be performed.

Because the optimization is performed on the intermediate representation of the libraries, the user does not have to be aware of the platform for which the library was originally coded. Because the optimization is performed on the whole of the library code, the partitioning of the code into the libraries can be based on the actual interactions among the code. Furthermore, the relocation of shared library code allows other optimization processes, such as working set reduction, boot page loading, and pre-fetching, to be more effective. The shared library optimization process also enables the inlining of crossed library calls.

The present invention describes systems, clients, servers, methods, and computer-readable media of varying scope. In addition to the aspects and advantages of the present invention described in this summary, further aspects and advantages of the invention will become apparent by referencing the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, for an exemplary embodiment of the invention are provided. Finally, in the fourth section, a conclusion of the detailed description is provided.

Hardware and Operating Environment

Figure 1:
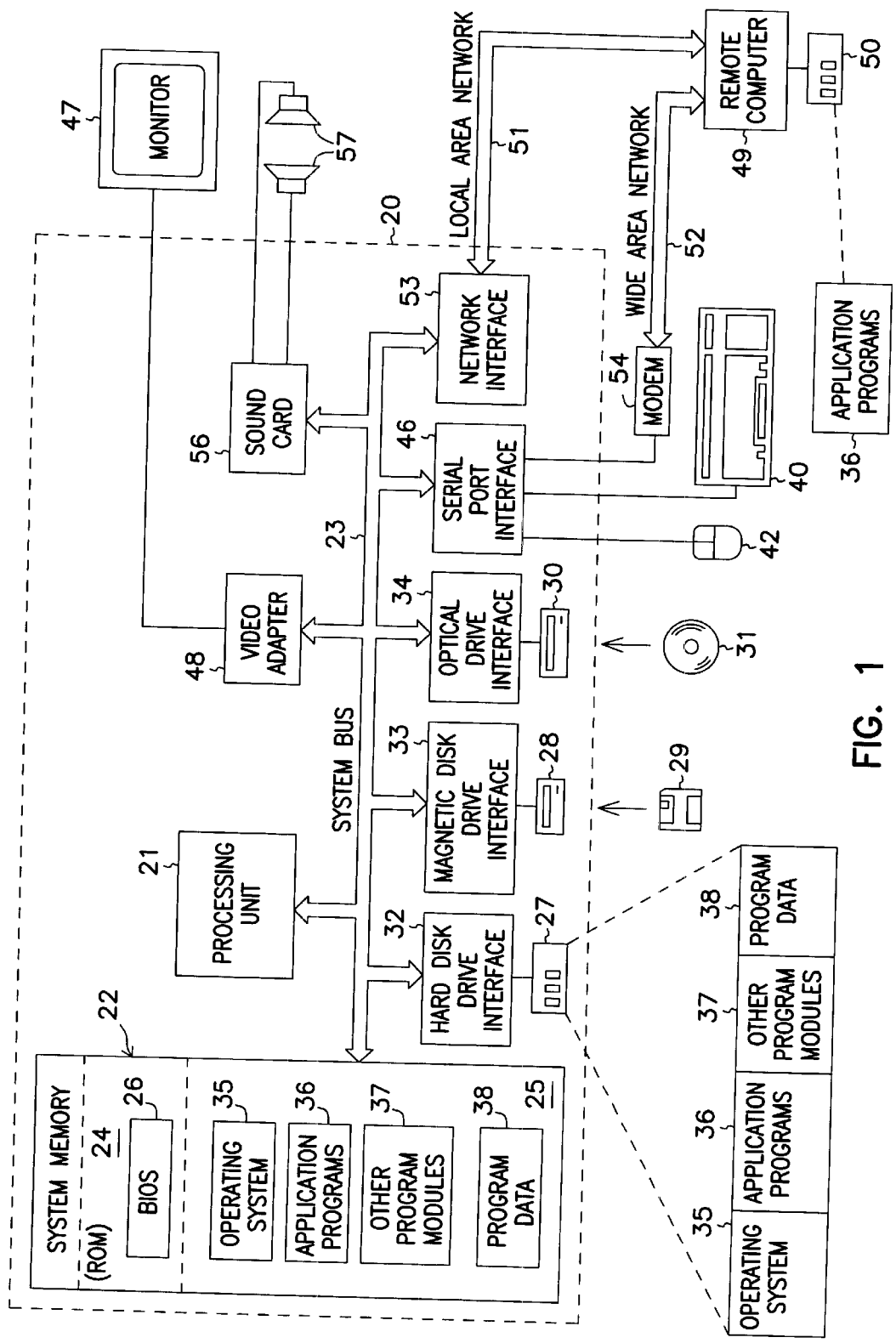
FIG. 1 is a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

Figure 2A:
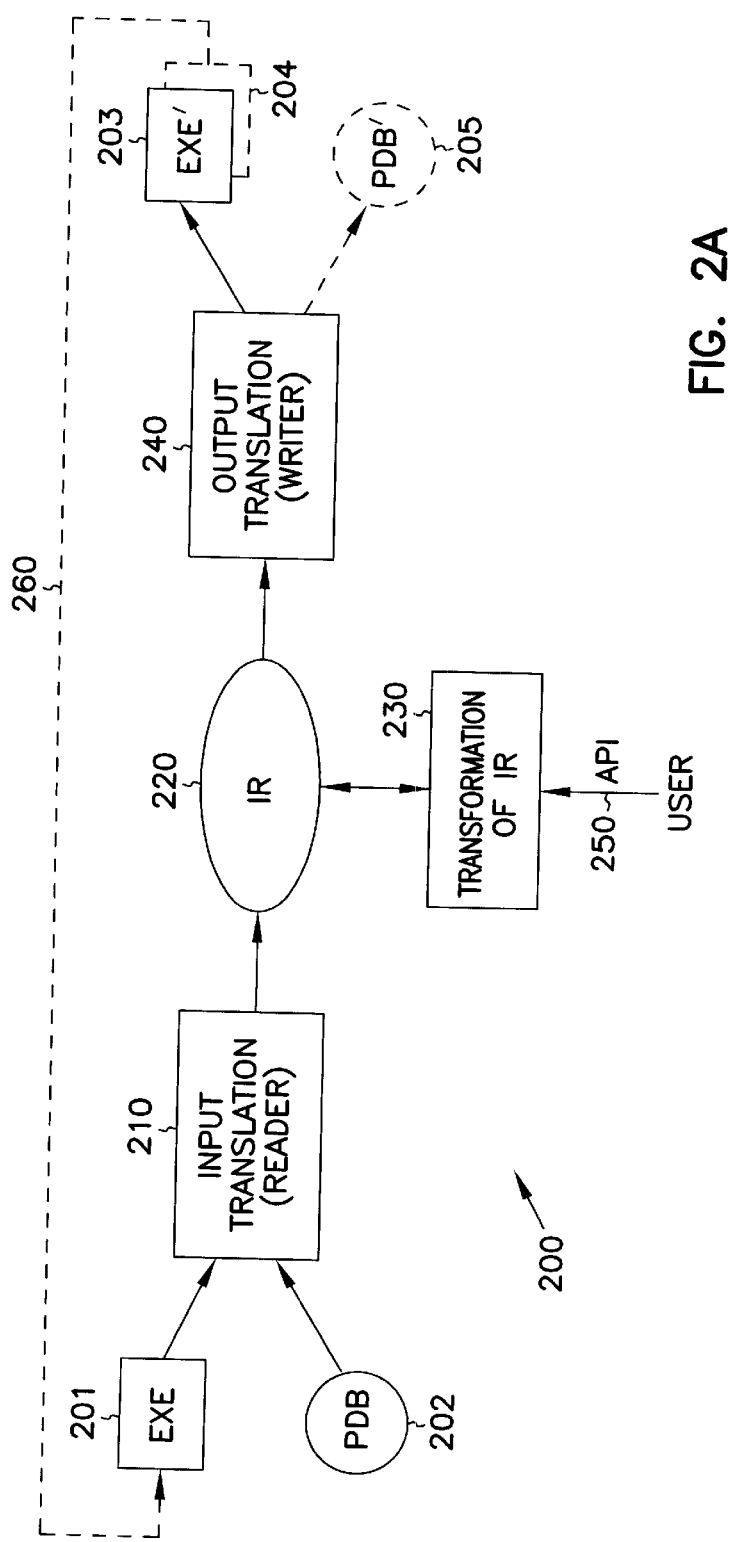
FIG. 2A is a diagram illustrating a system-level overview of an exemplary embodiment of the invention.

A system level overview of the operation of an exemplary embodiment of the invention is described by reference to FIGS. 2A–D. A heterogeneous program contains multiple executable components, such as main program code and shared libraries, written for different computer architectures (platforms) or programming languages. FIG. 2A shows a system 200 that translates and transforms components in a heterogeneous program. The system 200 comprises an input translator (reader) 210, a transformation module 230, and an output translator (writer) 240. All three modules work with a high-level abstraction of a heterogeneous program, referred to as an "intermediate representation" (IR) 220. The IR is a set of pseudo-instructions for a stack-based logical machine with an unlimited number of registers that represent the functionality of the heterogeneous program.

Figure 2B:
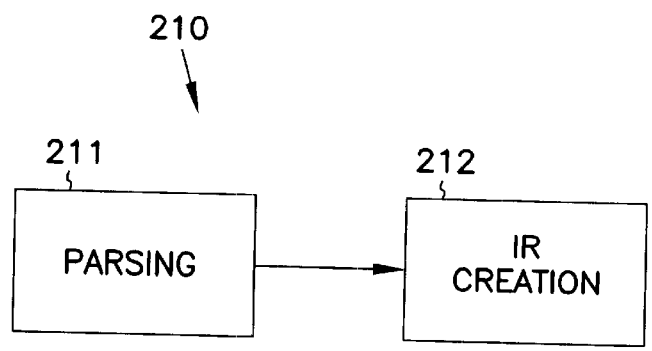
FIGS. 2B, 2C and 2D are diagrams illustrating additional details of the processes shown in FIG. 2A.
Figure 2C:
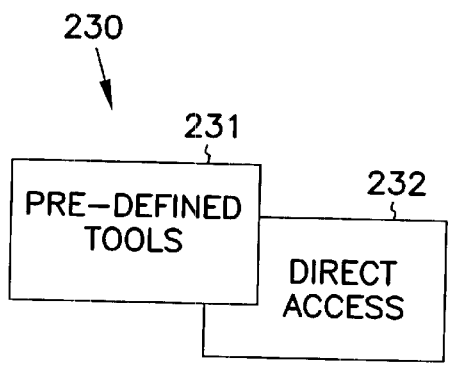

The reader 210 creates an IR 220 from an executable component (EXE) 201. The reader 210 is a two-stage process as shown in FIG. 2B. First, the executable 201 is parsed 211 into its basic blocks of code and data using information provided in a program database file (PDB) 202. As well-known in the art, a basic code block is defined as a code block having a single entry point and a single exit point. In an alternate embodiment, all the work performed by the parser 211 is input directly into the second stage of the reader 210, thus skipping the parsing process.

Once the code and data blocks are identified, an IR creation process 212 evaluates each platform-dependent instruction on a block-by-block basis. There are very large set of common instructions regardless of architecture, i.e., move, store, add, etc., that can be represented by a single platform-neutral IR instruction. For RISC (reduced instruction set computer) architectures, most, if not all, instructions can be easily translated into a single platform-neutral IR instruction. On the other hand, CISC (complex instruction set computer) architectures, such as the Intel x86 family, contain complex instructions that provide the function of multiple instructions. In one exemplary embodiment, the platform-dependent instructions that have a single platform-neutral IR instruction counterpart are translated into that platform-neutral instruction, while complex instructions are replicated as-is within the IR through an extended version of the basic IR instruction. A replicated complex instruction is marked with a signature that denotes its architecture. The output translator 240 recognizes a signed complex instruction and processes it as described further below. In an alternate embodiment, a complex instruction is represented by a set of platform-neutral IR instructions that perform the equivalent function.

Figure 3:
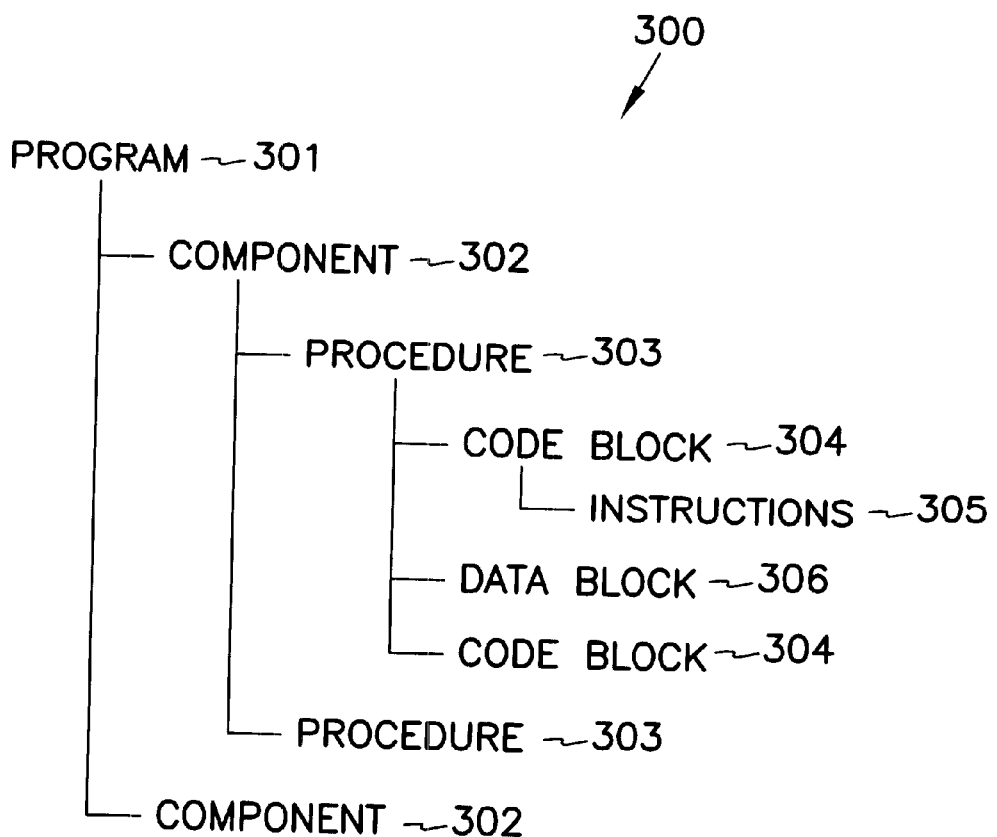
FIG. 3 is a diagram of an intermediate representation hierarchy used by the exemplary embodiment of FIG. 2A.

After the instructions in the code blocks have been translated, the IR creation process 212 creates a logical hierarchical view of the executable 201 as illustrated in FIG. 3. All architectures share the basic concepts of instructions 305, code blocks 304, data blocks 306, components 302, and procedures 303, so the IR hierarchy 300 enables the user to understand the structure of the intermediate representation of a heterogeneous program 301. The code blocks are logically connected as specified in the EXE 201 so that the blocks can be more easily manipulated during the transformation process 230. Procedures are determined by following the logical connections using information provided in the PDB file 202. Procedures are collected together to create the program components. Little or no optimization of the program is performed by the creation process 212 since it is desirable that the intermediate representation be as close to what the programmer originally wrote as possible.

However, tracing the logical connections to determine the procedures can result in more procedures being created than originally coded by the programmer. Therefore, the creation process 212 annotates, or "decorates," the hierarchy 300 with the user names supplied in the symbol table for the EXE 201. The annotations enable the user to understand how the IR control flows and how the elements of the IR hierarchy correspond to the procedures and the components in the original code so the appropriate transformations can be applied to the IR. The annotations are maintained in data structures for the procedures during the transformation process and output by the output translator 240.

At the end of the creation of the IR hierarchy, all instructions are represented in the hierarchy as IR instructions within code blocks so that there is no differentiation between code written for one platform and code written for a second platform. The creation of the IR and an exemplary embodiment of the IR hierarchy are described in detail in the related "Translation and Transformation" patent application.

Once the intermediate representation is complete, the user is allowed to manipulate the code and data (illustrated by the IR transformation module 230) through an application program interface (API) 250. The exemplary embodiment of the system 200 provides some pre-defined tools 231 (FIG. 2C) used to instrument and optimize the IR that are guaranteed to be safe in that the tools will evaluate a change requested by the user and only manipulate the code in an appropriate manner. The API 250 also permits the user direct access 232 to the IR to navigate through the IR and to make changes, such as moving blocks between procedures, modifying blocks, rearranging the logical connections between blocks, and changing the platform-specific instruction set for a code block. The tools 231 are described in detail in the related "Instrumentation and Optimization Tool" patent application. The API 250 is described in detail in the related "Application Program Interface" patent application.

By instrumenting the IR using the tools 231, the user can now watch the interrelationship between the various components of a heterogeneous program and determine if a block of code contained in one component is heavily used by another component, and therefore that block of code should be moved out of the first component and placed into the second component to speed up execution. The next section describes an exemplary embodiment of this process, along with other optimizations that can be applied to shared libraries. Alternately, the user may decide to copy, instead of move, the code into the second component, a process referred to in the art as "code replication." A common optimization technique called "inlining" utilizes code replication.

Figure 2D:
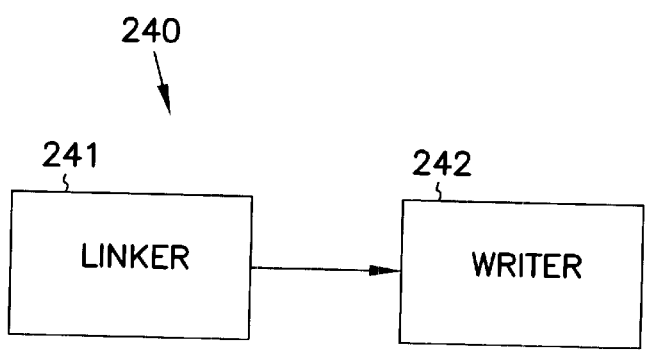

The transformed IR is now input into the output translator 240. The output translator 240 operates on the IR in two phases as shown in FIG. 2D: a linker phase 241 that resolves the logical connections into absolute addresses in an address space for a modified version of the executable, and a writer phase 242 that assembles the IR into the modified version of the executable (EXE') 203. The blocks in the executable 203 can be emitted by the writer 242 for their original platform, or can be emitted for a different platform.

The linker 241 must maintain the semantics of the code of the hierarchy when resolving the addresses, i.e., preserve the logical connections between blocks and the location of referenced data. The linker 241 determines the size of each code block based on the length of each instruction in the block. The linker 241 is also responsible for adding whenever prologue and epilogue code necessary to "glue" together contiguous blocks that will be assembled into different platform-dependent instructions. As part of the address resolution, the linker 241 also can perform limited code modification or optimization. For example, assume that prior to the transformation process 230, there was a jump between two code blocks, but those blocks are now contiguous. In this case, the linker 241 removes the now-unnecessary jump and lets the logic flow fall through to the second block. Because the hierarchy extends down to the instruction level and is consistent regardless of the manipulation performed by the user, the linker 241 has more knowledge of the placement of instructions than did the programmer. Thus, in architectures in which instructions have both a long and short form depending on the location they are addressing, the linker 241 chooses the appropriate instruction size, which can be a better choice than that originally made by the programmer.

The writer 242 assembles each IR instruction into its platform-dependent counterpart based on the architecture specified in the code block. In an exemplary embodiment in which complex instructions are replaced in the IR, if the complex instruction is being written to the same platform, the writer 242 merely emits the instruction. If the complex instruction is designated to be translated into a different architecture, the writer 242 creates the appropriate set of platform-specific instructions to perform the same function as the original, complex instruction.

As part of the EXE' 203, the writer 242 creates an emitted block information data structure containing the annotations created by the reader process 210 for each block in the executable. This allows the EXE' 203 to be iterated through the entire process 200 as many times as desired (represented by phantom arrow 260 and described in the related "Translation and Transformation" patent application), while enabling the user to distinguish the original procedures from those added in a previous iteration as described further below. In an alternate embodiment, the emitted block information is combined with the PDB file 202 to create a new version of the program database file (PDB') 205 (shown in phantom). The output translation process 240 is described in detail in the related "Cross Module Representation" patent application.

In an alternate exemplary embodiment of the translation and transformation system 200 not illustrated, the IR containing the absolute addresses assigned by the linker 241 is used as input into the IR creation process 212 for further iteration through the system 200. One of skill in the art will immediately appreciate that much of the work performed by the creation process 212 as described above can be skipped when iterating the modified IR through the system 200. This embodiment allows the user to transform a heterogeneous program in stages rather than having to make all the changes in a single pass through the system 200.

The system level overview of the operation of an exemplary embodiment of the invention has been described in this section of the detailed description. A translation and transformation system translates a binary component into an intermediate representation, provides an application program interface through which a user can transform the intermediate representation, and translates the intermediate representation as transformed by the user into a modified version of the binary. While the invention is not limited to any particular arrangement of modules, for sake of clarity exemplary set of modules has been described. One of skill in the art will readily recognize that the functions attributed to the modules described in this section can be assigned to different modules without exceeding the scope of the invention. Furthermore, although the translation and transformation of only one input component (EXE 201) has been illustrated and described above, the system can take multiple components, and accompanying PDB files, as input.

Methods of Exemplary Embodiments of the Invention

Figure 4A:
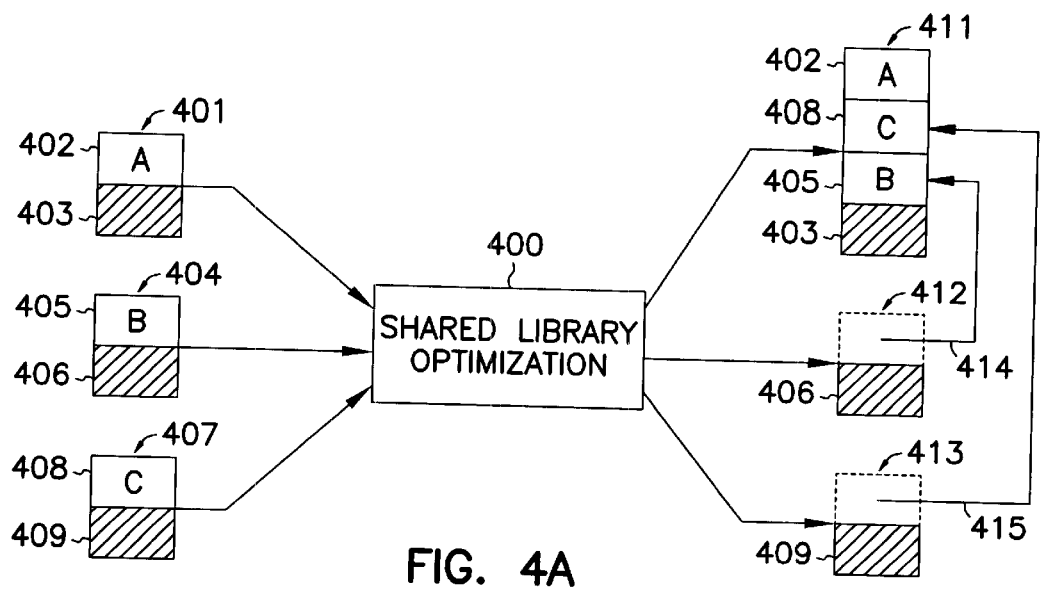
FIGS. 4A, 4B and 4C are diagrams illustrating shared libraries created by an exemplary embodiment of a shared library optimization method; is a flowchart of an output translator method
Figure 4B:
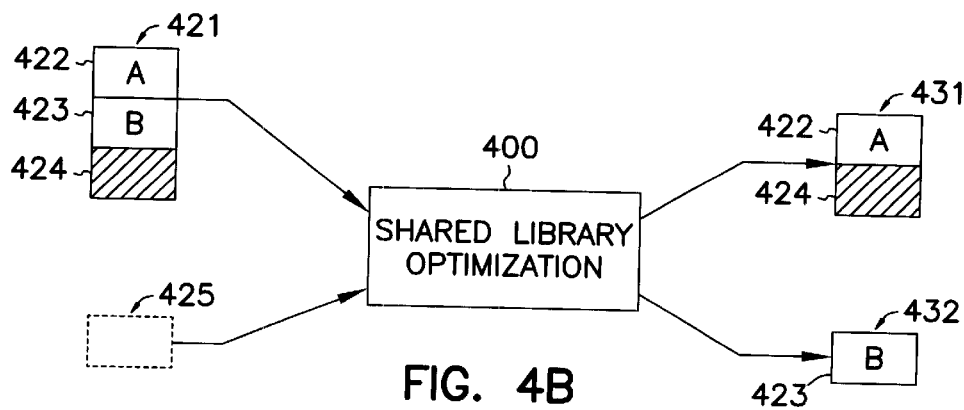
Figure 4C:
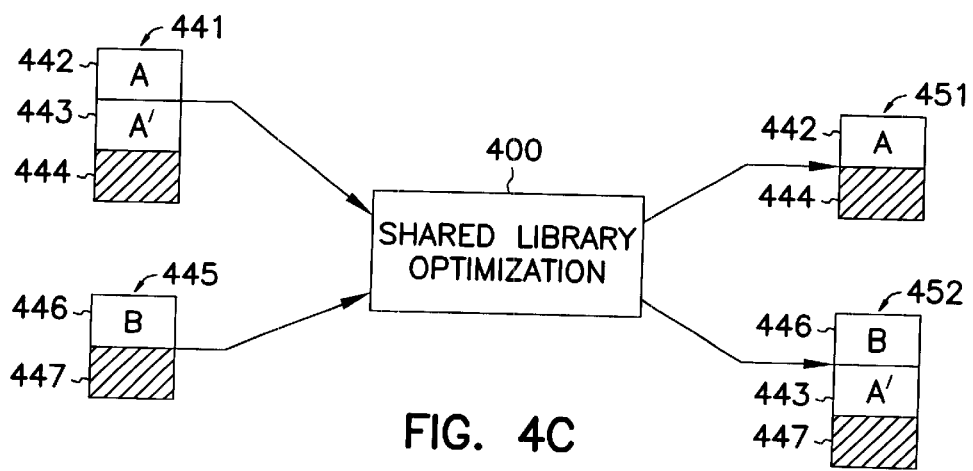
Figure 5:
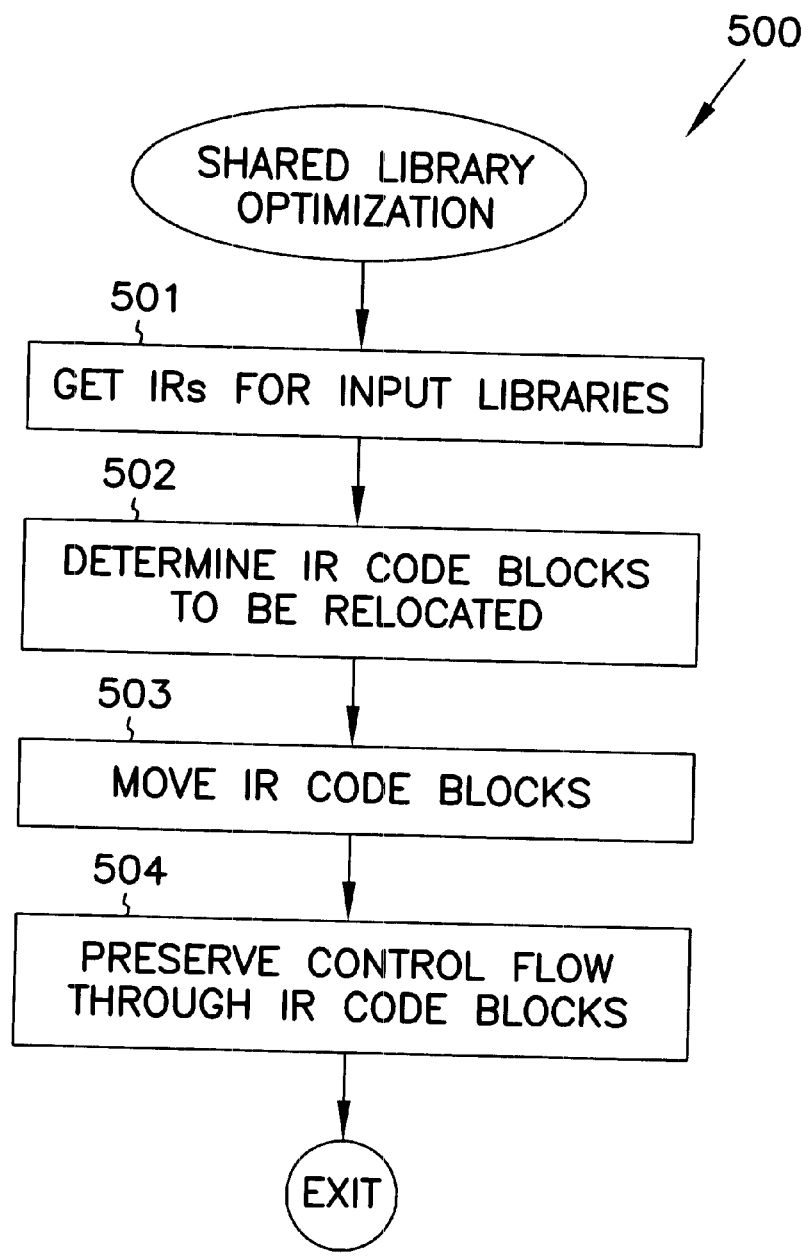
FIG. 5 is a flowchart of a shared library optimization method to be performed by a computer according to an exemplary embodiment of the invention.

In the previous section, a system level overview of the operations of exemplary embodiments of the invention was described. In this section, the particular methods performed by a computer executing such exemplary embodiments are described by reference to a series of flowcharts. The methods to be performed constitute computer programs made up of computer-executable instructions. Describing the methods by reference to a flowchart enables one skilled in the art to develop such programs including such instructions to carry out the methods on a suitable computer (the processor of the computer executing the instructions from computer-readable media). FIGS. 4A–C illustrate the inputs and outputs of a shared library optimization process 400 that operates as part of the transformation module 230 in FIG. 2A. Each of the inputs is a library component, such as EXE 201 in FIG. 2A that has been translated into an IR hierarchy 220. The shared library optimization process 400 rearranges the IR code blocks among the libraries, outputting modified versions of the libraries. The modified libraries are then translated by the output translator (writer) 240 into platform-specific instructions. The shared library optimization process 400 is performed by a computer executing an exemplary embodiment of a shared library optimization method 500 as shown in FIG. 5.

Three examples of shared library optimization are shown in FIGS. 4A–C: FIG. 4A illustrates merging multiple libraries into a single library; FIG. 4B illustrates splitting a single library into multiple libraries; and FIG. 4C illustrates moving code from one library into another.

Turning first to FIG. 4A, the IR code blocks for two libraries 404, 407 are merged into the IR for library 401. The output of the shared library optimization 400 is a merged library 411 containing the IR code block A 402 for library 401 combined with the IR code block B 405 and C 408 that were originally in libraries 404, 407. The merged library 411 retains the name and entry point(s) for library 401 so that existing programs that reference library 401 do not have to be recompiled. Two "shadow" libraries 412, 413 are also created by the shared library optimization process 400. Shadow libraries 412, 413 contain the IR data blocks 406, 409 for libraries 404, 407 respectively. Shadow libraries 412, 413 retain the names of the corresponding pre-optimization libraries and the shared library optimization 400 creates "forwarding" pointers 414, 415 from the shadow libraries to the appropriate entry points in the merged library 411.

For compatibility, the shared library optimization process 400 does not relocate resources from the shadow libraries into the merged library. Therefore, if an application tries to load resources contained in the data block 406 from the pre-optimized library 404, the same resources can be found in the data block 406 in the shadow library 412. In an alternate embodiment not shown, the shared library optimization process 400 does merge thread local storage sections from the shadow libraries into the merged library. By creating the same number of libraries with the same names, all applications work as before. External applications that rely on a particular library being present do not have to change.

FIG. 4B illustrates the process in reverse. A shared library containing two IR code blocks, A 422 and B 423, is split by the shared library optimization process 400 into two shared libraries 431, 432. A shadow library 425 is input into the shared library optimization process 400 to hold the IR code block B 423. As with the merging of shared libraries, the IR data block 424 remains in its original shared library 431. The shared library optimization process 400 locates all references to code block B 423 in code block A 422 and substitutes the new addresses within the shared library 432. The two libraries are bound together, so that external programs do not have to change.

When shared libraries reference common code, instrumenting the shared libraries together (such as described in the related "Instrumentation and Optimization" patent application) may reveal that the libraries would be more efficient if the common code was moved from one library into the other. Such an optimization is illustrated in FIG. 4C. Shared library 441 contains an IR code block A' 443 that is more frequently referenced by the shared library 445 than by library 441. The shared library optimization process 400 moves the code block A' 443 from the shared library 441 into the shared library 445, outputting shared library 452 that contains the original code block B 446 from shared library 445 combined with the code block A' 443 from the shared library 441. As before, the shared library optimization method does not relocate the data blocks and ensures that references to the code block A' 443 correctly point to the new addresses within library 452.

The flowchart in FIG. 5 illustrates the acts performed by a computer when executing an exemplary embodiment of the shared library optimization method 500 that implements the shared library optimization 400 show in FIGS. 4A–C. The user invokes the method 500, naming the libraries to be optimized (block 501) and specifying what IR code blocks are to be relocated and the type of relocation desired (block 502). The method 500 moves the specified code blocks from their original IR into one of the other IRs as determined by the type of relocation (block 503).

The method 500 preserves the semantics of the original control flow through the IR code blocks by creating forwarding pointers or re-assigning references to the relocated code blocks (block 504). The initialization for the constituent libraries in an application occurs in a specific order so the libraries need to retain the same initialization sequence after optimization. To maintain the correct library loading order, the shared library optimization method 500 arranges the initialization routines within the libraries so that when a new thread or new process is initialized, the loader invokes the initialization routines in the correct order.

In one exemplary embodiment, the method 500 maintains the original loading order for the libraries by preserving the dependencies among the libraries, such as when one library imports data from another. Returning to FIG. 4A, assume that shared library B 404 was originally dependent upon both library A 401 and library C 407. The shared library optimization method 500 leaves a single reference in shadow library 412 (corresponding to library A) to merged library 411 and a single reference to shadow library 413, even though there is no longer any code in shadow library 412 that depends on the data imported from the libraries 411, 413. Only one reference to each of the other libraries is required to describe the dependency among the libraries and to cause the operating system to follow the original loading sequence when loading the shadow library 412.

When the shared libraries are programmed for different architectures, the relocation of a code block can place it into a library programmed for a different platform. Because the optimization is performed on the IRs for the shared libraries, instead of on the platform-specific instructions, the user can ignore cross-platform issues. Any "glue" code necessary to interface the relocated code block to the existing code blocks in the output library is provided by the output translator (writer) 240 as described in the related "Cross Module Representation" patent application.

Using the shared library optimization method 500 to produce a merged library and shadow libraries as shown in FIG. 4A requires that the binding process be modified to allow binding through a shadow library. As a result, if an application invokes a library that has been merged, it will always goes to the shadow library at least once. The second time the application invokes the shadow library, it will be patched through to the merged library by the loader in the operating system. Alternately, the first-time forwarding can be eliminated for known libraries by having the loader rebind those libraries to go directly to the merged library rather than being forwarded through the pointers.

The particular methods performed by computer in executing an exemplary embodiment of a transformation process in module 230 that optimizes shared libraries has been described with reference to flowcharts including all the acts from 501 until 504. In addition, three examples of shared library optimizations in accordance with the methods have been illustrated.

Conclusion

A shared library optimization process has been described that enables the relocation of code among shared libraries. All the code of one library can be merged into another library, or part of the code of one library can be placed into a different existing library or used to create a new library.

The relocation of shared library code allows other optimization processes to be more effective. If the libraries are interdependent, optimization tools that partition code into pages can be more effective in reducing the working set. In particular if the libraries are less than one page of live code, the page utilization can be improved. Furthermore, data can be packed onto the pages more effectively. If the libraries are related or loaded at about the same time, optimization tools will be able to place the boot pages in sequential order according to the boot scenario, thus minimizing disk seeks. In addition, "tickling" optimization will also be more effective. Tickling optimization is a process that pre-fetches all related pages at boot time when the library initialization code is invoked. Therefore, if more libraries are merged together, the tickling of boot pages can extend to all libraries that have been merged. The merging of small libraries can increase the number of live pages in the library and consequently, make clustering more effective, i.e. when bringing more than one code page into memory for each disk read. Also code relocation permits the inlining of crossed library calls.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that the code blocks in FIGS. 4A–C are shown as contiguous within the libraries for ease of illustration but that the relocated code blocks can originate from, or be placed in, non-contiguous locations in the shared libraries. The terminology used in this application with respect to is meant to include all architectural environments that support the basic programming constructs embodied in the IR hierarchy. Therefore, it is manifestly intended that this invention be limited only by the following claims and equivalents thereof.

We claim:

1. A computerized method for optimizing a heterogeneous program having a plurality of platform-dependent shared libraries for differing platforms, wherein each of the platform-dependent shared libraries has a plurality of instructions associated with the platform-dependency of the shared library, the method comprising:

translating each of the platform-dependent shared libraries into a platform-neutral shared library;

identifying instructions to be relocated from a first platform-neutral shared library;

placing a copy of the instructions from the first platform-neutral shared library into a second platform-neutral shared library; and preserving a control flow from the first platform-neutral shared library to the copy of the instructions so that the copy of the instructions in the second platform-neutral shared library is accessible through the first platform-neutral shared library.

2. The method of claim 1, wherein preserving the control flow comprises:
marking the first platform-neutral shared library as a shadow library when all instructions in the first shared library are relocated.

3. The method of claim 1, wherein preserving the control flow comprises:
creating a forwarding pointer in the first platform-neutral shared library that points to the copy of the instructions in the second platform-neutral shared library.

4. The method of claim 1, wherein preserving the control flow comprises:
substituting an address for an entry point to the instructions in the first platform-neutral shared library with an address for a corresponding entry point to the copy of the instructions in the second platform-neutral shared library.

5. The method of claim 1, wherein the instructions of the second platform-neutral shared library have an initialization order and the initialization order changes when the copy of the instructions is placed in the second platform-neutral shared library, and preserving the control flow comprises:
arranging initialization routines for the instructions in the second platform-neutral shared library so that the initialization order after the copy of the instructions is placed in the second platform-neutral shared library matches the initialization order before the copy of the instructions was placed in the second platform-neutral shared library.

6. The method of claim 1, wherein the second platform-neutral shared library is a shadow library.

7. The method of claim 1, further comprising:
moving a portion of a data block in the first platform-neutral shared library into the second platform-neutral shared library.

8. A computerized method for optimizing shared libraries in a heterogeneous program comprising:
obtaining an platform-neutral intermediate representation of each of the shared libraries;
determining a code block in the intermediate representation of a first shared library to relocate;
placing the code block from the first shared library into the intermediate representation of a second shared library; and
substituting an address for an entry point to the code block in the first shared library with an address for the corresponding entry point to the code block from the first shared library as relocated into the second shared library.

9. The method of claim 1, further comprising:
determining a code block in the intermediate representation of a third shared library to relocate;
placing the code block from the third shared library into the intermediate representation of the second shared library; and
preserving a control flow between the code block from the third shared library and code blocks of the second shared library as before the code block from the third shared library was relocated.

10. A computer-readable medium having computer-executable instructions to a cause a computer to perform shared library optimization on intermediate representations for a plurality of library components comprising:
relocating a code block in the intermediate representation of one library into the intermediate representation of a different library; and
associating a reference to the code block with the relocated code block.

11. The computer-readable medium of claim 10, further comprising:
relocating a code block in the intermediate representation of another library into the intermediate representation of the different library.

12. The computer-readable medium of claim 10, wherein relocating the code block causes the one library to become a shadow library.

13. The computer-readable medium of claim 12, wherein the intermediate representation of the shadow library comprises a data block.

14. A computerized system comprising:
a processing unit;
a system memory coupled to the processing unit through a system bus;
a computer-readable medium coupled to the processing unit through a system bus;
a set of platform-neutral intermediate representations for a plurality of platform-dependent shared libraries in the system memory; and
a transformation module executed from the computer-readable medium by the processing unit, wherein the transformation module causes the processing unit to move a code block from the intermediate representation of a shadow library into the intermediate representation of a merged library to optimize the shared libraries.

15. The computerized system of claim 14, wherein the transformation module further causes the processing unit to insert a forwarding pointer to the merged library into the intermediate representation of the shadow library.

16. The computerized system of claim 14, wherein the transformation module further causes the processing unit to locate all references to the code block in the set of intermediate representations and substitute an address in the intermediate representation of the merged library.

17. The computerized system of claim 14, wherein the transformation module further causes the processing unit to move a data block associated with the code block from the intermediate representation of the shadow library into the intermediate representation of the merged library.

18. The computerized system of claim 14, further comprising:
an output translation module executed from the computer-readable medium by the processing unit, wherein the output translation module causes the processing unit to translate the intermediate representations of the shadow and merged libraries into platform-specific code; and
an application program executed from the computer-readable medium by the processing unit, wherein a first reference to the code block in the shadow library made by the application program causes the processing unit to forward the reference to the merged library.

19. The computerized system of claim 18, wherein the first reference to the code block in the shadow library causes the processing unit to modify the application program to reference the code block in the merged library.

20. The computerized system of claim 17, wherein the processing unit forwards the reference using a pointer stored in the shadow library.

21. The computerized system of claim 17, wherein the processing unit forwards the reference using binding information.

22. The computerized system of claim 13, wherein the transformation module further causes the processing unit to leave a reference to each shared library on which the shadow library is dependent.

23. The computerized system of claim 21, further comprising:
- an output translation module executed from the computer-readable medium by the processing unit, wherein the output translation module causes the processing unit to translate the intermediate representations of the shadow and merged libraries into platform-specific code; and
- a loader process executed from the computer-readable medium by the processing unit, wherein the loader process causes the processing unit to load the platform-specific code for each shared library upon which the shadow library is dependent in an order determined by the references in the shadow library.

* * * * *

UNITED STATES PATENT AND TRADEMARK OFFICE
CERTIFICATE OF CORRECTION

PATENT NO. : 6,460,178 B1
DATED : October 1, 2002
INVENTOR(S) : Chan et al.

It is certified that error appears in the above-identified patent and that said Letters Patent is hereby corrected as shown below:

Title Page,
Item [56], References Cited, OTHER PUBLICATIONS, "Lee, H., et al.," reference, delete "Proceedings of the 1997 Usenix Symposium pn Internet Technologies and Systems" and replace with
-- "Proceedings of the 1997 Unsenix Symposium on Internet Technologies and Systems" --

Column 2,
Line 29, delete "AmitabhSrivastava" and replace with -- Amitabh Srivastava --
Line 36, replace "EEL: machine-Independent Executable Editing..." with
-- EEL: Machine-Independent Executable Editing --

Column 13,
Line 64, replace "10. A computer-readable medium having computer-executable instruction to a cause a computer to perform shared library optimization on intermediate representations", and replace with -- 10. A computer readable medium having computer-executable instruction to cause a computer to perform shared library optimization on intermediate representations --

Column 14,
Line 62, replace "20. The computerized system of claim 17", and replace with
-- 20. The computerized system of claim 18 --
Line 65, replace "21. The computerized system of claim 17", and replace with
-- 20. The computerized system of claim 18 --

UNITED STATES PATENT AND TRADEMARK OFFICE
CERTIFICATE OF CORRECTION

PATENT NO. : 6,460,178 B1
DATED : October 1, 2002
INVENTOR(S) : Chan et al.

It is certified that error appears in the above-identified patent and that said Letters Patent is hereby corrected as shown below:

Column 15,
Line 1, replace "22. The computerized system of claim 13" and replaced with
-- 21. The computerized system of claim 14 --
Line 5, replace "23. The computerized system of claim 21" and replace with
-- 23. The computerized system of claim 22 --

Signed and Sealed this

Twenty-second Day of June, 2004

JON W. DUDAS
*Acting Director of the United States Patent and Trademark Office*